(12) United States Patent
Wang et al.

(10) Patent No.: US 11,203,265 B2
(45) Date of Patent: Dec. 21, 2021

(54) SYSTEM AND METHOD OF CONTROLLING POWER DISTRIBUTION FROM CHARGING SOURCE TO ELECTRIC VEHICLE

(71) Applicant: GM GLOBAL TECHNOLOGY OPERATIONS LLC, Detroit, MI (US)

(72) Inventors: Yue-Yun Wang, Troy, MI (US); David J. Brooks, Troy, MI (US); Jun-Mo Kang, Ann Arbor, MI (US); Donald K. Grimm, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 16/529,115

(22) Filed: Aug. 1, 2019

(65) Prior Publication Data
US 2021/0031643 A1    Feb. 4, 2021

(51) Int. Cl.
*H02J 7/00*      (2006.01)
*B60L 53/30*    (2019.01)
*B60L 53/60*    (2019.01)
*B60L 53/68*    (2019.01)
*B60L 58/26*    (2019.01)
*B60L 58/27*    (2019.01)
*B60L 50/60*    (2019.01)
(Continued)

(52) U.S. Cl.
CPC .......... *B60L 53/30* (2019.02); *B60H 1/00392* (2013.01); *B60H 1/143* (2013.01); *B60L 50/60* (2019.02); *B60L 53/305* (2019.02); *B60L 53/60* (2019.02); *B60L 53/68* (2019.02); *B60L 58/26* (2019.02); *B60L 58/27* (2019.02); *H01M 10/443* (2013.01); *H01M 10/613* (2015.04); *H01M 10/615* (2015.04); *H01M 10/625* (2015.04); *H01M 10/63* (2015.04); *H01M 10/663* (2015.04); *H02J 7/007* (2013.01); *H01M 2220/20* (2013.01)

(58) Field of Classification Search
None
See application file for complete search history.

(56) References Cited

U.S. PATENT DOCUMENTS

9,114,794 B2   8/2015  King et al.
9,731,617 B2   8/2017  Tseng et al.
(Continued)

*Primary Examiner* — Arun C Williams
(74) *Attorney, Agent, or Firm* — Quinn IP Law (57) ABSTRACT

System and method of controlling power distribution from a charging source to an electric vehicle having a battery. The system includes a plurality of switches selectively connectable between the charging source, the battery and a thermal circuit. A controller is configured to control operation of the plurality of switches to provide multiple settings for the electric vehicle. The controller is configured to select from the multiple settings based on part on a trigger signal from a mobile application. The multiple settings include an external power mode, a charging mode, a discharging mode and a mixed charging and conditioning mode. The mixed charging and conditioning mode allows charging of the battery concurrently with thermal conditioning of at least one of the battery and a cabin of the vehicle. The mixed charging and conditioning mode enables a power split between a thermal conditioning power ($P_T$) and a charging power ($P_C$).

20 Claims, 3 Drawing Sheets

(51) Int. Cl.
- *H01M 10/44* (2006.01)
- *H01M 10/615* (2014.01)
- *H01M 10/613* (2014.01)
- *H01M 10/625* (2014.01)
- *H01M 10/63* (2014.01)
- *H01M 10/663* (2014.01)
- *B60H 1/00* (2006.01)
- *B60H 1/14* (2006.01)

(56) References Cited

U.S. PATENT DOCUMENTS

| | | | |
|---|---|---|---|
| 10,118,460 B1 | 11/2018 | Blatchley et al. | |
| 2004/0176021 A1* | 9/2004 | Mills | B60H 1/24 |
| | | | 454/143 |
| 2007/0049456 A1* | 3/2007 | Shimizu | B60W 10/08 |
| | | | 477/3 |
| 2009/0064696 A1* | 3/2009 | Perkins | B60H 1/00642 |
| | | | 62/244 |
| 2010/0090527 A1* | 4/2010 | Tarnowsky | B60H 1/00278 |
| | | | 307/10.7 |
| 2012/0047928 A1* | 3/2012 | Fukatsu | B60H 1/00392 |
| | | | 62/150 |
| 2016/0332527 A1* | 11/2016 | North | H02J 3/322 |
| 2018/0334170 A1 | 11/2018 | Liu et al. | |

* cited by examiner

SYSTEM AND METHOD OF CONTROLLING POWER DISTRIBUTION FROM CHARGING SOURCE TO ELECTRIC VEHICLE

INTRODUCTION

The present disclosure relates to a system and method of controlling power distribution from a charging source to an electric vehicle having a battery. The use of purely electric and partially electric vehicles, employing a battery as an exclusive or non-exclusive source of propulsion, has greatly increased over the last few years. The batteries require periodic charging and may be employed as an energy source for multiple components of the vehicle, including both high-voltage and low-voltage components. At certain temperatures, such as temperatures below freezing, the charging and discharging of batteries may not be optimal.

SUMMARY

Disclosed herein are a system and method of controlling power distribution from a charging source to an electric vehicle having a battery. A thermal circuit is configured to selectively receive power from the charging source. The system includes a plurality of switches selectively connectable between the charging source, the battery and the thermal circuit. A controller is configured to control operation of the plurality of switches to provide multiple settings for the electric vehicle. A mobile application is configured to interface with the controller, with the mobile application being stored on a mobile device.

The controller includes a processor and tangible, non-transitory memory on which instructions are recorded. The controller is configured to select from the multiple settings based on part on a trigger signal from the mobile application. The multiple settings include an external power mode, a charging mode, a discharging mode and a mixed charging and conditioning mode. The mixed charging and conditioning mode allows charging of the battery concurrently with thermal conditioning of at least one of the battery and an interior cabin of the electric vehicle. The mixed charging and conditioning mode enables a power split between a thermal conditioning power ($P_T$) and a charging power ($P_C$).

The mobile application is configured to send the trigger signal when a plurality of factors meet a respective predefined criteria. The plurality of factors may include at least one of a predefined alarm set up time, a predicted departure time and a battery temperature. A cloud unit may be configured to interface with and provide a user profile data to the mobile application and the controller. The user profile data may include a logged departure time history, cabin temperature at an average vehicle start time, the battery temperature at the average vehicle start time and a battery state of charge at the average vehicle start time.

The mobile application may be configured to determine whether the electric vehicle is off-charge (such as for example, not being plugged into a charging source) at the predefined alarm set up time. When the electric vehicle is off-charge at the predefined alarm set up time, the mobile application is configured to determine a warm-up time for at least one of the battery and the interior cabin, and alert a user to connect the electric vehicle to the charging source with the external power mode for at least a first time duration prior to the departure time. The first time duration is greater than the warm-up time, allowing sufficient time for warming up the battery prior to the departure time.

The warm-up time (t) for the battery may be based at least partially on a battery temperature ($T_b$) such that:

$$\frac{dT_b}{dt} = \left[\frac{dQ - hA(T_b - T_{c,out}) - hA(T_b - T_a)}{M_b C_{pb}}\right].$$

Here dQ is an amount of heat released from the battery, h is a heat exchange coefficient, A is an effective surface area of the battery, $T_{c,out}$ is a temperature of a coolant configured to cool the battery, $T_a$ is an ambient temperature, $M_b$ is a mass of the battery and $C_{pb}$ is a battery heat capacity.

The plurality of switches may include a first switch selectively connecting the charging source to the controller, a second switch selectively connecting the controller to the battery and a third switch selectively connecting the controller to the thermal circuit. The third switch may be connected at a first junction upstream of the second switch. The mixed charging and conditioning mode is operational when the first switch, the second switch and the third switch are each closed. The external power mode is operational when the first switch and the third switch are closed and the second switch is open, the external power mode being configured to disconnect the battery from the charging source. The charging mode is operational when the first switch and the second switch are closed and the third switch is open. The discharging mode is operational when the second switch and the third switch are closed and the first switch is open.

In an alternate configuration, the plurality of switches includes a first switch selectively connecting the charging source to the controller, a second switch selectively connecting the controller to the battery, a third switch selectively connecting the controller to the thermal circuit and a fourth switch selectively connecting the controller to the thermal circuit. In the alternate configuration, the third switch is connected at a first junction downstream of the second switch. The fourth switch is connected at a second junction upstream of the second switch and a third junction downstream of the third switch. Here the mixed charging and conditioning mode is operational when the first switch, the second switch and the third switch are each closed and the fourth switch is open. The external power mode is operational when the first switch and the fourth switch are closed, the second switch and the third switch being open. The charging mode is operational when the first switch and the second switch are closed, the third switch and the fourth switch being open. The discharging mode is operational when the first switch, the second switch and fourth switch are open, the third switch being closed.

When the battery temperature is less than or equal to a first threshold, at least one of the controller and the mobile application may be configured to select the external power mode to thermally condition the battery such that the battery current is zero. When the battery temperature is above the first threshold and below a second threshold, at least one of the controller and the mobile application may be configured to select the mixed charging and conditioning mode from the multiple settings and select a constant voltage charging modality for charging the battery. Here the power split between the conditioning power ($P_T$) and the charging power ($P_C$) is based in part on a respective voltage ($V_c$) from the charging source and the battery current ($I_b$) such that: $P_T=(P_C-I_b*V_c)$.

When the battery temperature is at or above the second threshold, at least one of the controller and the mobile application may be configured to select the mixed charging and conditioning mode from the multiple settings and select a constant current charging modality for charging the battery. Here the power split between the conditioning power ($P_T$) and the charging power ($P_C$) is based in part on the respective voltage ($V_b$) of the battery and the battery current ($I_b$) such that: $P_T=(P_C-I_b*V_b)$.

The above features and advantages and other features and advantages of the present disclosure are readily apparent from the following detailed description of the best modes for carrying out the disclosure when taken in connection with the accompanying drawings.

DETAILED DESCRIPTION

Figure 1:
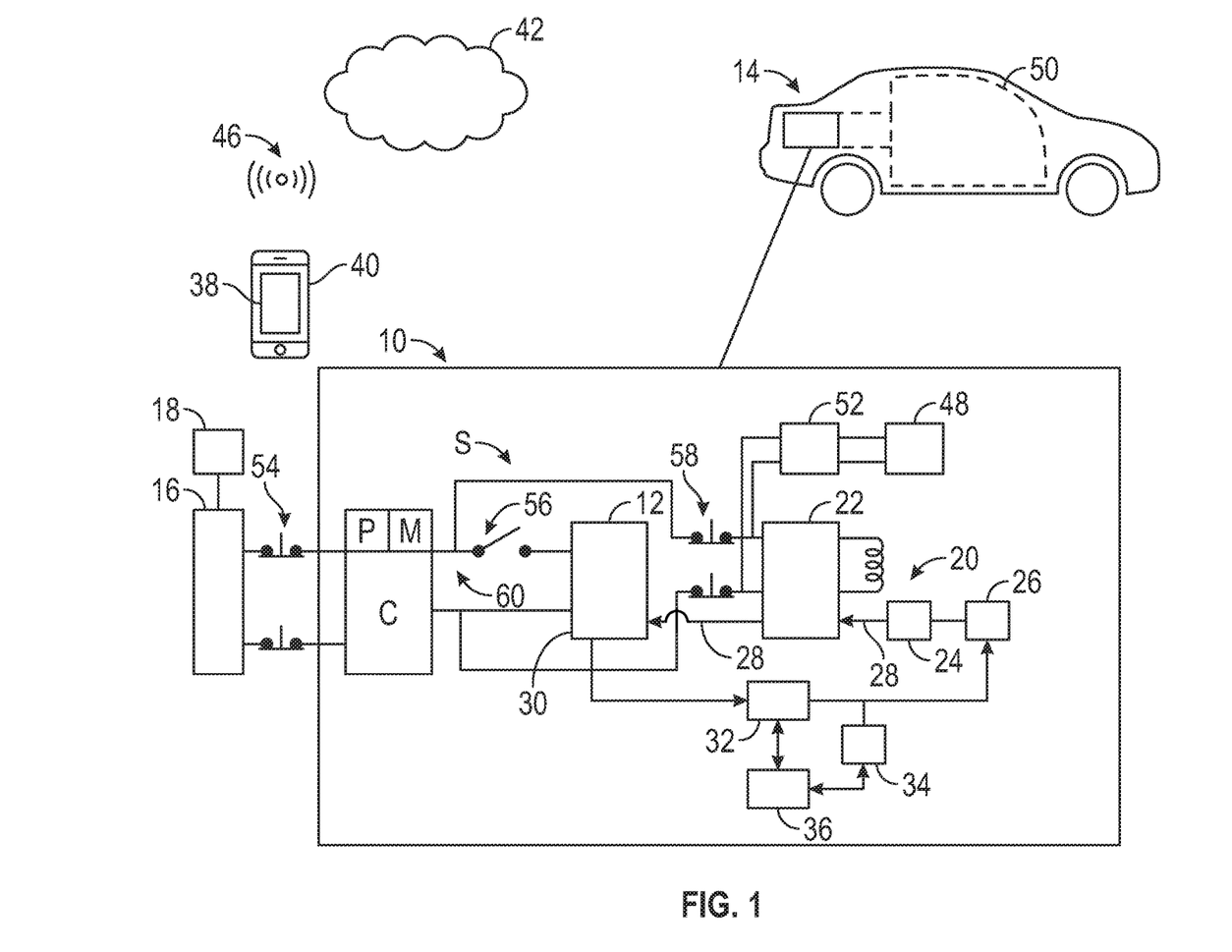
FIG. 1 is a schematic illustration of a system of distributing power from a charging source to an electric vehicle having a battery, a plurality of switches and a controller configured to interface with a mobile application.

Referring to the drawings, wherein like reference numbers refer to like components, FIG. 1 schematically illustrates a system 10 for controlling power distribution to a rechargeable energy storage unit, referred to herein as battery 12, and other components of an electric vehicle 14. The power is channeled from a charging source 16, which may be a retail charging station, an industrial unit, a home unit or other unit. The electric vehicle 14 may be a mobile platform, such as, but not limited to, a passenger vehicle, sport utility vehicle, light truck, heavy duty vehicle, ATV, minivan, bus, transit vehicle, bicycle, robot, farm implement (e.g. tractor), sports-related equipment (e.g. golf cart), boat, plane and train. The electric vehicle 14 may take many different forms and may be partially electric or fully electric.

Referring to FIG. 1, communication with the charging source 16 may be facilitated by a user interface 18 operatively connected to the charging source 16. Referring to FIG. 1, the system 10 includes a thermal circuit 20 configured to selectively receive power from the charging source 16. The thermal circuit 20 includes a high voltage heater 22, a pressurized pump 24 and tank 26. Thermal fluid, referred to herein as coolant 28, is stored in the tank 26 and delivered to the heater 22 via the pressurized pump 24. The coolant 28 may leave the heater 22 and enter a cooling portion 30 (e.g. a cooling plate) embedded in or otherwise thermally connected to the battery 12 for purposes of regulating the temperature of the battery 12. The thermal circuit 20 may further include a battery chiller or evaporator 32, an air compressor 34 and a condenser 36, each working in concert to reduce the temperature of the coolant 28 as needed. It is to be understood that the thermal circuit 20 may include other components and circuitry available to those skilled in the art.

Referring to FIG. 1, a plurality of switches S is selectively connectable between the charging source 16, the battery 12 and the thermal circuit 20. The plurality of switches S enable a respective circuit connection when in an ON state and disable the respective circuit connection when in an OFF state. The plurality of switches S may be joint contact switches and may be composed of semi-conductors. In one example, the plurality of switches S are silicon MOSFET switches. Other switches available to those skilled in the art may be employed. The battery 12 may include rechargeable units having different chemistries, including not limited to, lithium-ion, lithium-iron, nickel metal hydride and lead acid batteries, with the number of units being varied based on the application at hand.

Referring to FIG. 1, a controller C is configured to control operation of the plurality of switches S to provide multiple (power) settings for the electric vehicle 14. The controller C includes at least one processor P and at least one memory M (or non-transitory, tangible computer readable storage medium) on which instructions are recorded for executing a method 300 for controlling distribution of power from the charging source 16 to the electric vehicle 14. The memory M can store controller-executable instruction sets, and the processor P can execute the controller-executable instruction sets stored in the memory M.

Referring to FIG. 1, a mobile application 38 is configured to interface with the controller C. The mobile application 38 may be stored on a mobile device 40, such as a smartphone operated by a user of the electric vehicle 14. Additionally, the controller C and/or the mobile application 38 may communicate with the charging source 16 via the user interface 18. The controller C is configured to select from the multiple settings based on part on a trigger signal from the mobile application 38. The mobile application 38 is configured to send the trigger signal when a plurality of factors meet a respective predefined criteria. The plurality of factors may include a predefined alarm set up time, a predicted departure time, a plug-in charging status and a battery temperature. The mobile application 38 may be in communication with the controller C, such that it has access to the data in the controller C.

Referring to FIG. 1, a cloud unit 42 may be configured to interface with and provide a user profile data to the mobile application 38 and the controller C. The user profile data may include a logged departure time history, cabin temperature at an average vehicle start time, the battery temperature at the average vehicle start time and a battery state of charge at the average vehicle start time. Referring to FIG. 1, the controller C, the cloud unit 42 and the mobile application 38 may communicate through a network connection 46, which may be a short-range network or a long-range network. The cloud unit 42 may be a public, private or commercial source of information. Alternatively, the mobile application 38 may be built into and run on an infotainment system of the electric vehicle 14. The circuitry and components of a mobile application 38 ("apps") available to those skilled in the art may be employed.

Referring to FIG. 1, the thermal circuit 20 is operatively connected to an auxiliary power supply 48, for thermal conditioning of various components of the electric vehicle 14. For example, power supplied by the charging source 16 may be channeled for thermal conditioning of an interior cabin 50 of the electric vehicle 14. In one example, the power supplied by the charging source 16 is at a relatively high voltage (e.g. 360 to 400 Volts), the auxiliary power supply 48 is configured to supply a relatively low voltage (e.g. 12 Volts) and a DC-DC converter 52 is employed as an intermediary.

The plurality of switches S may be controlled to provide multiple settings for the electric vehicle 14, including an external power mode, a charging mode, a discharging mode and a mixed charging and conditioning mode. The mixed charging and conditioning mode is configured to allow charging of the battery 12 concurrently with thermal conditioning of at least one of the battery 12 and the interior cabin 50. The mixed charging and conditioning mode enables a power split (of the total power available) between a thermal conditioning power ($P_T$) and a charging power ($P_C$). The mobile application 38 may be configured to allow on-demand pre-conditioning for the battery 12 and interior cabin 50 with the mixed charging and conditioning mode.

Referring to FIG. 1, the plurality of switches S includes a first switch 54 selectively connecting the charging source 16 to the controller C, a second switch 56 selectively connecting the controller to the battery 12 and a third switch 58 selectively connecting the controller C to the thermal circuit 20. In the first configuration shown in FIG. 1, the third switch 58 is connected at a first junction 60 upstream of the second switch 56. In the first configuration, the mixed charging and conditioning mode is operational when the first switch 54, the second switch 56 and the third switch 58 are each closed. The external power mode is operational when the first switch 54 and the third switch 58 are closed and the second switch 56 is open. The external power mode is configured to disconnect the battery 12 from the charging source 16. The charging mode is operational when the first switch 54 and the second switch 56 are closed, and the third switch 58 is open. The discharging mode is operational when the second switch 56 and the third switch 58 are closed and the first switch 54 is open. In the discharging mode, the battery 12 will provide energy to an electric motor (not shown) that provides propulsion power to the electric vehicle 14.

Figure 2:
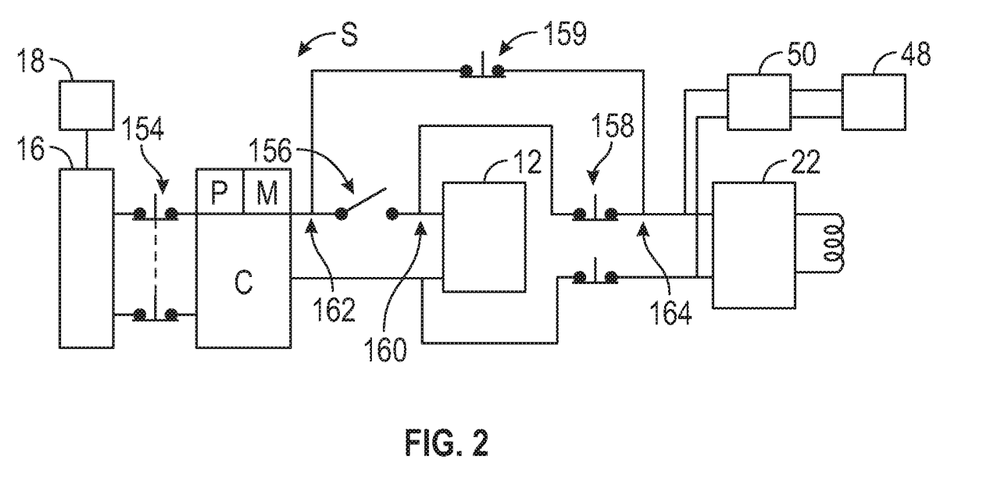
FIG. 2 is a schematic fragmentary illustration of an alternate configuration for the plurality of switches shown in FIG. 1.

FIG. 2 is a schematic fragmentary illustration of an alternate configuration for the plurality of switches S. Here, the plurality of switches S includes a first switch 154 selectively connecting the charging source 16 to the controller C, a second switch 156 selectively connecting the controller C to the battery 12 and a third switch 158 selectively connecting the controller C to the thermal circuit 20. The alternate configuration includes a fourth switch 159 selectively connecting the controller C to the thermal circuit 20. Referring to FIG. 2, the third switch 158 is connected at a first junction 160 downstream of the second switch 156. The fourth switch 159 is connected at a second junction 162 upstream of the second switch 156 and a third junction 164 downstream of the third switch 158.

In the alternate configuration of FIG. 2, the mixed charging and conditioning mode is operational when the first switch 154, the second switch 156 and the third switch 158 are each closed and the fourth switch 159 is open. The external power mode is operational when the first switch 154 and the fourth switch 159 are closed, the second switch 156 and the third switch 158 being open. Referring to FIG. 2, the charging mode is operational when the first switch 154 and the second switch 156 are closed, the third switch 158 and the fourth switch 159 being open. The discharging mode is operational when the first switch 154, the second switch 156 and fourth switch 159 are open, the third switch 158 being closed.

Figure 3:
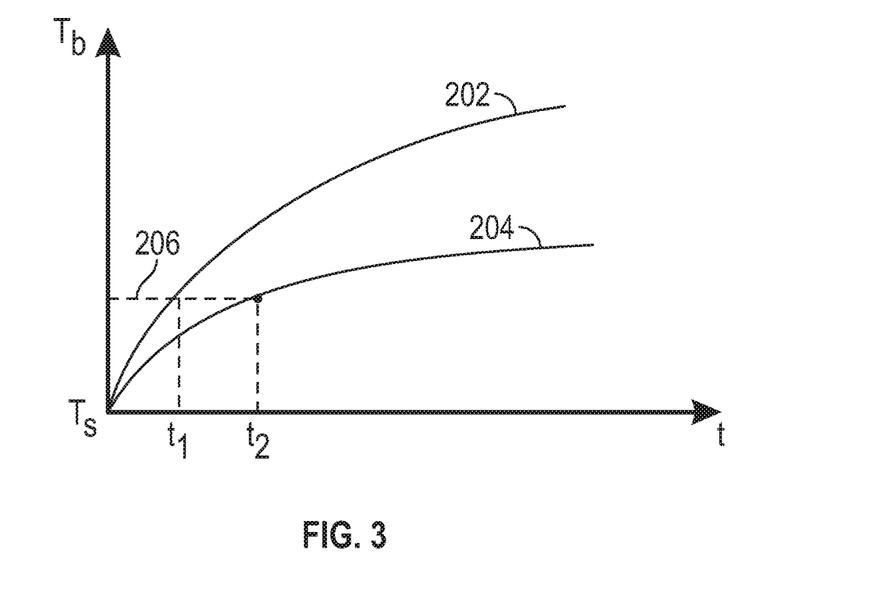
FIG. 3 a schematic example graph showing battery temperature on the vertical axis and estimated thermal conditioning time on the horizontal axis.

Referring now to FIG. 3, a schematic example graph of battery temperature ($T_b$) on the vertical axis and warm up time (for the battery 12) is shown on the horizontal axis. The first trace 202 and the second trace 204 show the battery temperature relative to warm up time for a first available power and a second available power, the first available power being greater than the second available power. The starting temperature is indicated by $T_S$. As shown in FIG. 3, the first warm up time ($t_1$) and the second warm up time ($t_2$) indicate the time required to reach a desired battery temperature 206 (from the starting temperature $T_S$) at the first available power and the second available power, respectively. At least one of the controller C and the mobile application 38 may be configured to generate multiple traces at different power levels to represent battery temperature over time.

Figure 4:
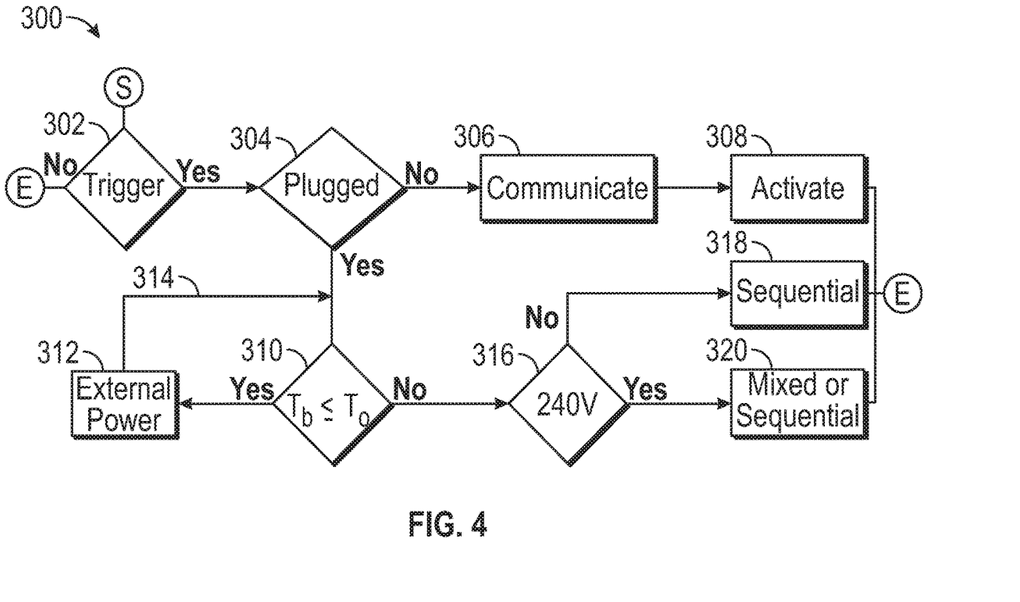
FIG. 4 is a schematic flow diagram of a method executable by the controller and/or mobile application of FIG. 1.

Referring now to FIG. 4, a flowchart of the method 300 is shown. Method 300 may be stored on and executable by at least one of the controller C and the mobile application 38 of FIG. 1. The method 300 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The method 300 begins at block 302, where it is determined if a trigger signal has been received from the mobile application 38. If so, the method 300 proceeds to block 304. If not, the method 300 is ended. The mobile application 38 may be configured to send the trigger signal when a plurality of factors meet a respective predefined criteria. The plurality of factors may include a predefined alarm set up time (e.g. a wake up time of the user), a specific time (e.g. 1 hour) prior to a predicted departure time and a battery temperature (e.g. being below a specific temperature).

Per block 304, the mobile application 38 and/or the controller C is configured to determine whether the electric vehicle 14 is plugged into the charging source 16. If the electric vehicle 14 is off-charge (e.g., not plugged into the charging source 16) at the predefined alarm set up time, per block 306 of FIG. 4, the mobile application 38 and/or the controller C may be configured to determine a warm-up time for at least one of the battery 12 and the interior cabin 50, and communicate to a user to connect or plug the electric vehicle 14 to the charging source 16 with the external power mode for a first time duration prior to the departure time. The first time duration is selected to be greater than the warm-up time to allow sufficient time for warm-up prior to the expected departure time.

The warm-up time for the battery 12 may be modeled based in part on equations (1), (2) and (3), described below, using methods and techniques available to those skilled in the art. The methods may include numerical simulation using software such as MATLAB or C++. The warm-up time (t) for the battery may be based in part on a battery temperature ($T_b$) such that:

$$\frac{dT_b}{dt} = \left[ \frac{dQ - hA(T_b - T_{c,out}) - hA(T_b - T_a)}{M_b C_{pb}} \right]. \quad \text{(Equation 1)}$$

Here dQ is the heat released from the battery 12 if the battery 12 is being charged, h is a heat exchange coefficient, A is an effective surface area of the battery 12, $T_{c,out}$ is a temperature of the coolant 28 leaving the heater 22 and entering the cooling portion 30 of the battery 12, $T_a$ is the ambient temperature, $M_b$ is a mass of the battery and $C_{pb}$ is a battery heat capacity. The heat exchange between the battery 12, the coolant 28, the heater 22 and the pump 24 may be represented by the following equations:

$$\frac{dT_{c,in}}{dt} = \left[\frac{c_{pc}\dot{m}_c(T_{c,out} - T_{c,in}) - hA(T_{c,out} - T_b)}{M_c C_{pc}}\right].$$ (Equation 2)

$$\frac{dT_{c,out}}{dt} = \left[\frac{dQh + c_{pc}\dot{m}_c(T_{c,in} - T_{c,out}) - hA(T_{c,in} - T_a)}{M_c C_{pc}}\right].$$ (Equation 3)

Here (in additional to the parameters above), $T_{c,in}$ is a temperature of the coolant 28 entering the heater 22, $\dot{m}_c$ is a flow rate of the coolant 28, dQh is an amount of heat transferred to the coolant 28 from the heater 22, $M_c$ is a mass of the coolant 28 and $C_{pc}$ is a heat capacity of the coolant 28.

The warm-up time for the interior cabin 50 may be obtained using a cabin climate thermal model or look-up table available to those skilled in the art. The input factors to the cabin climate thermal model may include a desired cabin temperature, a circulating cabin air flow rate, the cooling or heating power available, the ambient temperature, and a thermal capacitance factor of the air, wall and seats in the interior cabin 50. Additionally, per block 308 of FIG. 4, the mobile application 38 and/or the controller C may be configured to activate a wireless charging source 16 (if the charging source 16 is a wireless charger) to deliver power through the external power mode for the first time duration prior to the departure time.

The method 300 proceeds from block 304 to block 310 when the electric vehicle 14 is plugged into the charging source 16. In block 310, the mobile application 38 and/or the controller C is configured to determine if the battery temperature is less than or equal to a first threshold ($T_0$). In one example, the first threshold ($T_0$) is 0 degrees Celsius. If so, the method 300 proceeds to block 312, where the external power mode is selected to thermally condition the battery 12. The battery current is configured to be zero in the external power mode. As indicated by line 314, the method 300 loops back to block 310 from block 312 until the battery temperature is above the first threshold ($T_0$).

Per block 310, if the battery temperature is greater than the first threshold ($T_0$), the method 300 proceeds to block 316, where the mobile application 38 and/or the controller C is configured determine if the charging source 16 is at a relatively high voltage. If the charging source 16 is at a relatively low voltage, such as 110 Volts, the method 300 proceeds to block 318, where a sequential protocol is selected. The sequential protocol involves first charging the battery 12 using the charging mode and then thermally conditioning the interior cabin 50 (or other component) with the external power mode. If the charging source 16 is at a relatively high voltage, such as 240 Volts, the method 300 proceeds to block 320, where either the sequential protocol or a mixed protocol 400 may be selected.

Figure 5:
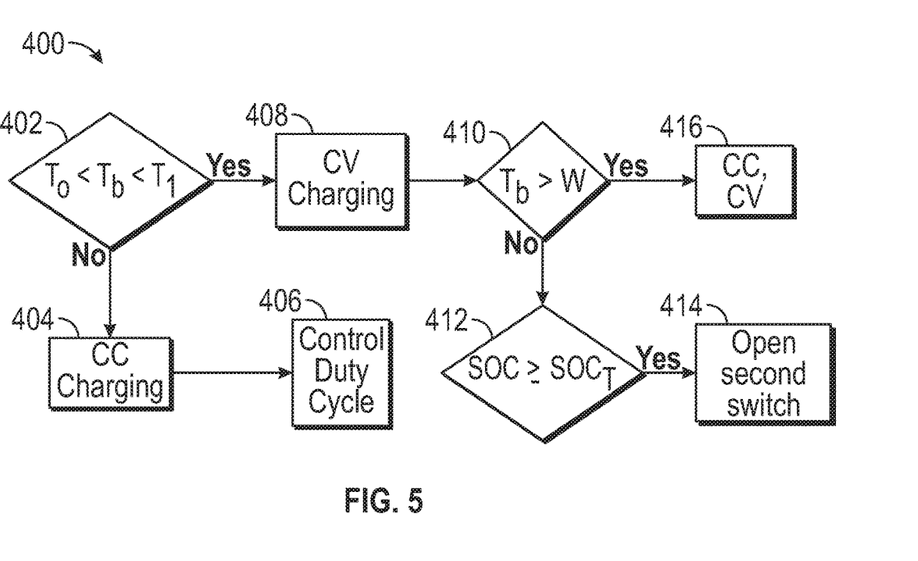
FIG. 5 is a schematic flow diagram of a mixed protocol executable by the controller and/or mobile application of FIG. 1.

A flowchart of the mixed protocol 400 is shown in FIG. 5. Per block 402 of FIG. 5, the mobile application 38 and/or the controller C is configured to determine if the battery temperature is above the first threshold ($T_0$) and below a second threshold ($T_1$). If so, the mixed protocol 400 proceeds to block 408. In one example, the first threshold ($T_0$) is 32 Fahrenheit and the second threshold ($T_1$) is 45 Fahrenheit. The various thresholds may be selected based on the application at hand.

The mixed protocol 400 proceeds from block 402 to block 404 when the battery temperature is above the second threshold ($T_1$). Per block 404, at least one of the controller C and the mobile application 38 is configured to select the mixed charging and conditioning mode from the multiple settings and select a constant current charging modality for charging the battery 12. Here the power split between the conditioning power ($P_T$) and the charging power ($P_C$) is based in part on the respective voltage ($V_b$) of the battery 12 and the battery current ($I_b$) such that: $P_T=(P_C-I_b*V_b)$. The mixed protocol 400 proceeds from block 404 to block 406, where the heating/cooling PWM duty cycle of the charging source 16 is controlled to generate a desired heating or cooling power to ensure sufficient power.

In block 408, the mobile application 38 and/or the controller C is configured to select the mixed charging and conditioning mode from the multiple settings, along with a constant voltage charging modality for charging the battery 12. Here the power split between the conditioning power ($P_T$) and the charging power ($P_C$) is based in part on a respective voltage ($V_c$) from the charging source and the battery current ($I_b$) such that: $P_T=(P_C-I_b*V_c)$.

Next, per block 410, the mobile application 38 and/or the controller C is configured to determine if the battery temperature ($T_b$) is above a target warm-up temperature (W). In one example, the target warm-up temperature (W) is selected to be 60 Fahrenheit. If so, the mixed protocol 400 proceeds to block 416, where either the constant voltage charging modality or the constant current charging modality is selected to continuously charge the battery 12. If the battery temperature ($T_b$) is less than the target warm-up temperature (W), the mixed protocol 400 proceeds from block 410 to block 412.

Per block 412, the controller C and/or mobile application 38 is configured to determine if a state of charge (SOC) of the battery 12 is greater than or equal to a predefined target state of charge ($SOC_T$). The state of charge may be obtained from one or more sensors (not shown) in communication with the battery 12. The state of charge refers to the stored charge available to do work relative to that which is available being fully charged and may be viewed as an assessment of the potential energy, extending between a minimum of 0% and a maximum of 100%. If so, the mixed protocol 400 proceeds from block 412 to block 414, where the second switch 56, 156 (see FIGS. 1 and 2) is opened to disconnect the battery 12 and cease charging of the battery 12. If not, the mixed protocol 400 loops back to block 410.

In summary, the system 10 allows intelligent pre-conditioning of the battery 12 and/or the interior cabin 50 and battery fast charging under different weather conditions, such as for example conditions below the freezing point, prior to the expected departure time of the electric vehicle 14. The trigger of pre-conditioning is based on learned personalized driver behaviors and communication between the mobile application 38, a user profile from a cloud unit 42, and the controller C of the electric vehicle 14. The system 10 has the technical advantage of allowing electrical components of the electric vehicle 14 to take energy flexibly either directly from a source such as the charging station 16 or from the battery 12. Accordingly, the system 10 improves the functioning of the electric vehicle 14.

The flowcharts in FIGS. 4-5 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The controller C of FIG. 1 may be an integral portion of, or a separate module operatively connected to, other controllers of the electric vehicle 14. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of controlling power distribution from a charging source to an electric vehicle having a battery, the system comprising:
    a thermal circuit configured to selectively receive power from the charging source;
    a plurality of switches selectively connectable between the charging source, the battery and the thermal circuit;
    a controller configured to control operation of the plurality of switches to provide multiple settings for the electric vehicle, the multiple settings including an external power mode, a charging mode, a discharging mode and a mixed charging and conditioning mode;
    a mobile application configured to interface with the controller, the mobile application being stored on a mobile device;
    wherein the controller includes a processor and tangible, non-transitory memory on which instructions are recorded, execution of the instructions causing the controller to select from the multiple settings based in part on a trigger signal from the mobile application; and
    wherein the mixed charging and conditioning mode allows charging of the battery concurrently with thermal conditioning of at least one of the battery and an interior cabin of the electric vehicle, the mixed charging and conditioning mode enabling a power split between a thermal conditioning power ($P_T$) and a charging power ($P_C$).

2. The system of claim 1, wherein:
    the mobile application is configured to send the trigger signal when a plurality of factors meet a respective predefined criteria; and
    the plurality of factors include at least one of a predefined alarm set up time, a predicted departure time and a battery temperature.

3. The system of claim 2, further comprising:
    a cloud unit configured to interface with and provide a user profile data to the mobile application and the controller; and
    wherein the user profile data includes a logged departure time history, a cabin temperature at an average vehicle start time, the battery temperature at the average vehicle start time and a battery state of charge at the average vehicle start time.

4. The system of claim 1, wherein:
    the mobile application is configured to determine whether the electric vehicle is off-charge at a predefined alarm set up time; and
    when the electric vehicle is off-charge at the predefined alarm set up time, the mobile application is configured to:
        determine a warm-up time for at least one of the battery and the interior cabin; and
        alert a user to connect the electric vehicle to the charging source with the external power mode at least a first time duration prior to a departure time, the first time duration being greater than the warm-up time.

5. The system of claim 4, wherein:
the warm-up time (t) for the battery is based in part on a battery temperature ($T_b$) such that:

$$\frac{dT_b}{dt} = \frac{dQ - hA(T_b - T_{c,out}) - hA(T_b - T_a)}{M_b C_{pb}};$$

and
wherein dQ is an amount of heat released from the battery, h is a heat exchange coefficient, A is an effective surface area of the battery, $T_{c,out}$ is a temperature of a coolant configured to cool the battery, $T_a$ is an ambient temperature, $M_b$ is a mass of the battery and $C_{pb}$ is a battery heat capacity.

6. The system of claim 1, wherein:
the plurality of switches include a first switch selectively connecting the charging source to the controller, a second switch selectively connecting the controller to the battery and a third switch selectively connecting the controller to the thermal circuit;
the third switch is connected at a first junction upstream of the second switch;
the mixed charging and conditioning mode is operational when the first switch, the second switch and the third switch are each closed;
the external power mode is operational when the first switch and the third switch are closed and the second switch is open, the external power mode being configured to disconnect the battery from the charging source;
the charging mode is operational when the first switch and the second switch are closed and the third switch is open; and
the discharging mode is operational when the second switch and the third switch are closed and the first switch is open.

7. The system of claim 1, wherein:
the plurality of switches include a first switch selectively connecting the charging source to the controller, a second switch selectively connecting the controller to the battery, a third switch selectively connecting the controller to the thermal circuit, and a fourth switch selectively connecting the controller to the thermal circuit;
the third switch is connected at a first junction downstream of the second switch;
the fourth switch is connected at a second junction upstream of the second switch and a third junction downstream of the third switch;
the mixed charging and conditioning mode is operational when the first switch, the second switch and the third switch are each closed and the fourth switch is open;
the external power mode is operational when the first switch and the fourth switch are closed, the second switch and the third switch being open;
the charging mode is operational when the first switch and the second switch are closed, the third switch and the fourth switch being open; and
the discharging mode is operational when the first switch, the second switch and fourth switch are open, the third switch being closed.

8. The system of claim 1, wherein:
when a battery temperature is less than or equal to a first threshold, at least one of the controller and the mobile application is configured to select the external power mode to thermally condition the battery such that a battery current is zero.

9. The system of claim 8, wherein:
when the battery temperature is above the first threshold and below a second threshold, at least one of the controller and the mobile application is configured to select the mixed charging and conditioning mode from the multiple settings and select a constant voltage charging modality for charging the battery; and
the power split between the conditioning power ($P_T$) and the charging power ($P_C$) is based in part on a respective voltage ($V_c$) from the charging source and the battery current ($I_b$) such that: $P_T=(P_C-I_b*V_c)$.

10. The system of claim 9, wherein:
when the battery temperature is at or above the second threshold, at least one of the controller and the mobile application is configured to select the mixed charging and conditioning mode from the multiple settings and select a constant current charging modality for charging the battery; and
the power split between the conditioning power ($P_T$) and the charging power ($P_C$) is based in part on the respective voltage ($V_b$) of the battery and the battery current ($I_b$) such that: $P_T=(P_C-I_b*V_b)$.

11. A method of controlling power distribution from a charging source to an electric vehicle having a battery and a controller with a processor and tangible, non-transitory memory, the method comprising:
configuring a thermal circuit to selectively receive power from the charging source;
connecting a plurality of switches between the charging source, the battery and the thermal circuit;
controlling operation of the plurality of switches, via the controller, to provide multiple settings for the electric vehicle, the multiple settings including an external power mode, a charging mode, a discharging mode and a mixed charging and conditioning mode;
configuring the mixed charging and conditioning mode to allow charging of the battery concurrently with thermal conditioning of at least one of the battery and an interior cabin of the electric vehicle, the mixed charging and conditioning mode enabling a power split between a thermal conditioning power ($P_T$) and a charging power ($P_C$);
storing a mobile application on a mobile device and configuring the controller to interface with the mobile application; and
selecting from the multiple settings, via the controller, based in part on a trigger signal from the mobile application.

12. The method of claim 11, further comprising:
configuring the mobile application to send the trigger signal when a plurality of factors meet a respective predefined criteria; and
including at least one of a predefined alarm set up time, a predicted departure time and a battery temperature in the plurality of factors.

13. The method of claim 12, further comprising:
configuring a cloud unit to interface with and provide a user profile data to the mobile application and the controller; and
including a logged departure time history, cabin temperature at an average vehicle start time, the battery temperature at the average vehicle start time and a battery state of charge at the average vehicle start time in the user profile data.

14. The method of claim 11, further comprising:
configuring the mobile application to determine whether the electric vehicle is off-charge at a predefined alarm set up time;
determining a warm-up time for at least one of the battery and the interior cabin, via the mobile application, when the electric vehicle is off-charge at the predefined alarm set up time; and
alerting a user to connect the electric vehicle to the charging source with the external power mode at least a first time duration prior to a departure time, the first time duration being greater than the warm-up time.

15. The method of claim 14, further comprising:
determining the warm-up time (t) for the battery based in part on a battery temperature ($T_b$) such that:

$$\frac{dT_b}{dt} = \frac{dQ - hA(T_b - T_{c,out}) - hA(T_b - T_a)}{M_b C_{pb}};$$

and
wherein dQ is an amount of heat released from the battery, h is a heat exchange coefficient, A is an effective surface area of the battery, $T_{c,out}$ is a temperature of a coolant configured to cool the battery, $T_a$ is an ambient temperature, $M_b$ is a mass of the battery and $C_{pb}$ is a battery heat capacity.

16. The method of claim 11, further comprising:
providing the plurality of switches with a first switch selectively connecting the charging source to the controller, a second switch selectively connecting the controller to the battery and a third switch selectively connecting the controller to the thermal circuit;
connecting the third switch at a first junction upstream of the second switch;
operating the mixed charging and conditioning mode when the first switch, the second switch and the third switch are each closed;
operating the external power mode when the first switch and the third switch are closed and the second switch is open, the external power mode being configured to disconnect the battery from the charging source;
operating the charging mode when the first switch and the second switch are closed and the third switch is open; and
operating the discharging mode when the second switch and the third switch are closed and the first switch is open.

17. The method of claim 11, further comprising:
providing the plurality of switches with a first switch selectively connecting the charging source to the controller, a second switch selectively connecting the controller to the battery, a third switch selectively connecting the controller to the thermal circuit, and a fourth switch selectively connecting the controller to the thermal circuit;
connecting the third switch at a first junction downstream of the second switch;
connecting the fourth switch at a second junction upstream of the second switch and a third junction downstream of the third switch;
operating the mixed charging and conditioning mode when the first switch, the second switch and the third switch are each closed and the fourth switch is open;
operating the external power mode when the first switch and the fourth switch are closed and the second switch and the third switch are open;
operating the charging mode when the first switch and the second switch are closed and the third switch and the fourth switch are open; and
operating the discharging mode when the first switch, the second switch and fourth switch are open and the third switch is closed.

18. The method of claim 11, further comprising:
selecting the external power mode to thermally condition the battery when a battery temperature is less than or equal to a first threshold, such that a battery current is zero, via at least one of the controller and the mobile application;
selecting the mixed charging and conditioning mode from the multiple settings when the battery temperature is above the first threshold and below a second threshold, via at least one of the controller and the mobile application; and
selecting a constant voltage charging modality for charging the battery when the battery temperature is above the first threshold and below the second threshold, and configuring the power split between the conditioning power ($P_T$) and the charging power ($P_C$) to be based in part on a respective voltage ($V_c$) from the charging source and the battery current ($I_b$) such that: $P_T=(P_C-I_b*V_c)$.

19. The method of claim 18, further comprising:
selecting the mixed charging and conditioning mode from the multiple settings when the battery temperature is at or above the second threshold, via at least one of the controller and the mobile application; and
selecting a constant current charging modality for charging the battery when the battery temperature is at or above the second threshold and configuring the power split between the conditioning power ($P_T$) and the charging power ($P_C$) to be based in part on the respective voltage ($V_b$) of the battery and the battery current ($I_b$) such that: $P_T=(P_C-I_b*V_b)$.

20. An electric vehicle comprising:
a battery configured to at least partially provide a propulsion energy;
a thermal circuit configured to thermally condition the battery, the thermal circuit being configured to selectively receive power from a charging source;
a plurality of switches selectively connectable between the charging source, the battery and the thermal circuit;
a controller configured to control operation of the plurality of switches to provide multiple settings for the electric vehicle, the controller including a processor and tangible, non-transitory memory on which instructions are recorded;
a mobile application configured to interface with the controller, the mobile application being stored on a mobile device;
wherein the controller is configured to select from the multiple settings based on part on a trigger signal from the mobile application, the multiple settings including an external power mode, a charging mode, a discharging mode and a mixed charging and conditioning mode; and
wherein the mixed charging and conditioning mode allows charging of the battery concurrently with thermal conditioning of at least one of the battery and an interior cabin of the electric vehicle, the mixed charging and conditioning mode enabling a power split between a thermal conditioning power ($P_T$) and a charging power ($P_C$).

* * * * *